Dec. 8, 1925.
M. M. FULTON
1,564,843
STACKING MACHINE
Filed Sept. 15, 1924      3 Sheets-Sheet 1
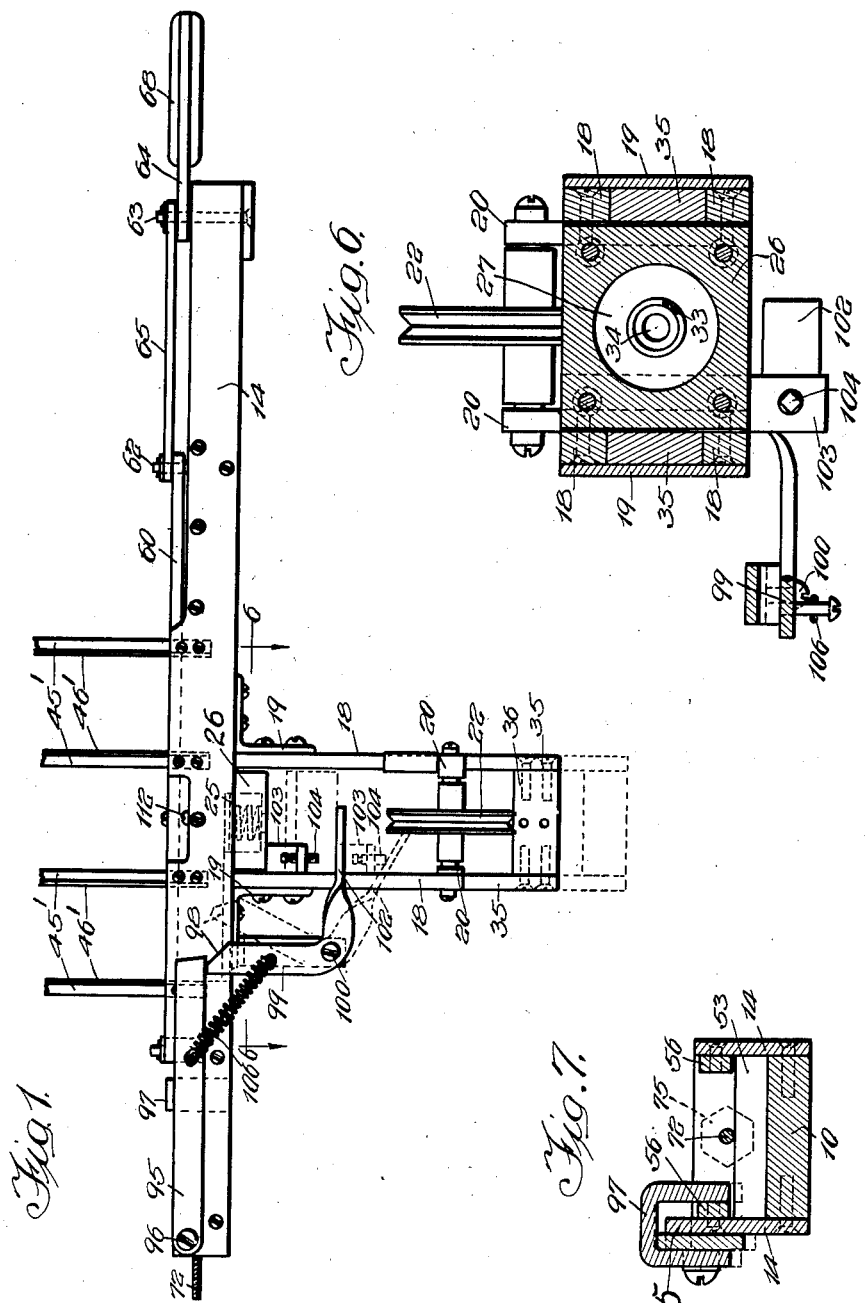

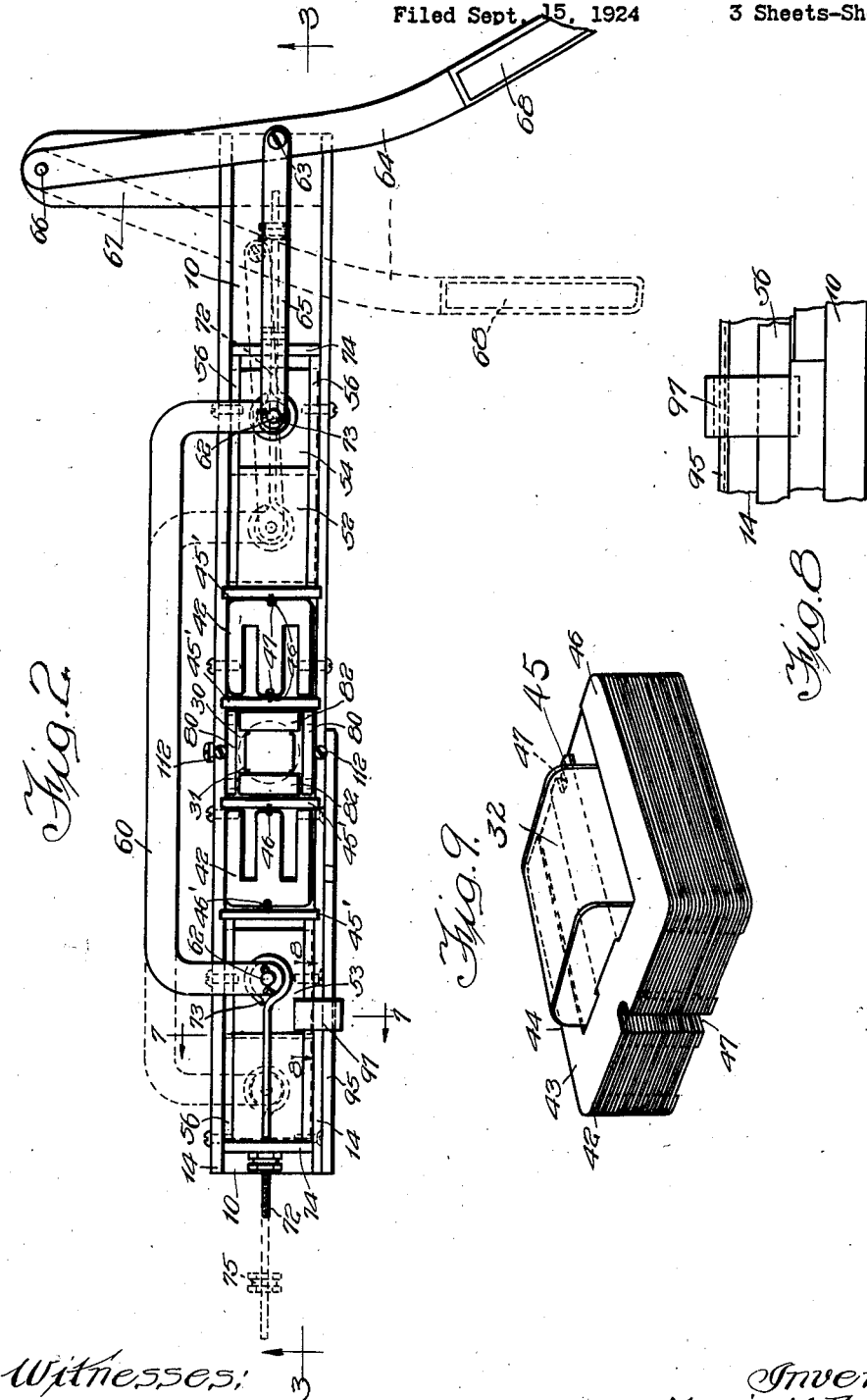

Dec. 8, 1925.
M. M. FULTON
STACKING MACHINE
Filed Sept. 15, 1924
1,564,843
3 Sheets-Sheet 3
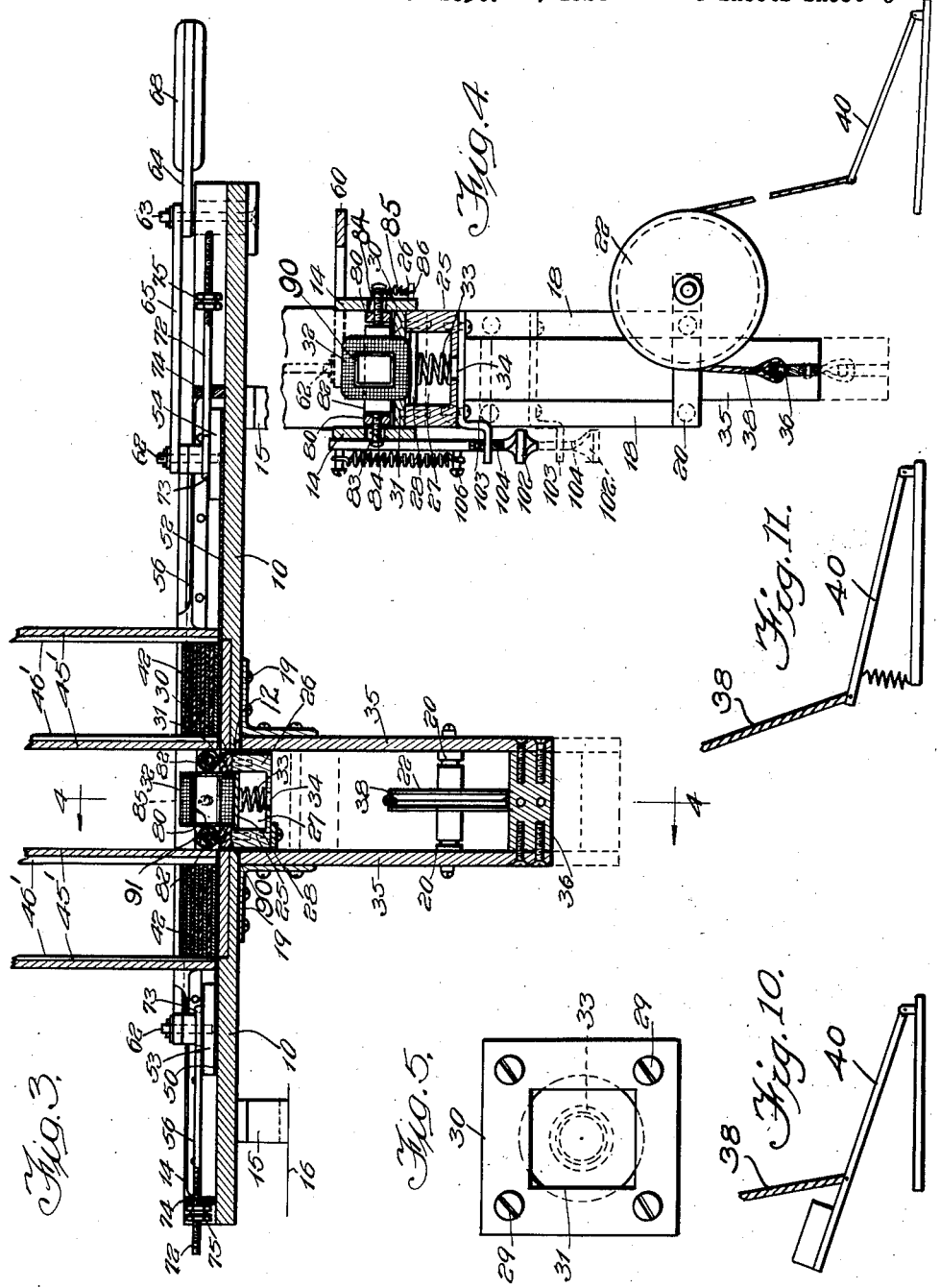

Patented Dec. 8, 1925.

1,564,843

UNITED STATES PATENT OFFICE.

MORRIS M. FULTON, OF CHICAGO, ILLINOIS, ASSIGNOR TO JEFFERSON ELECTRIC MFG. CO., OF CHICAGO, ILLINOIS, A CORPORATION OF ILLINOIS.

STACKING MACHINE.

Application filed September 15, 1924. Serial No. 737,958.

*To all whom it may concern:*

Be it known that I, MORRIS M. FULTON, a citizen of the United States, residing at Chicago, in the county of Cook and State of Illinois, have invented a certain new and useful Improvement in Stacking Machines, of which the following is a full, clear, concise, and exact description, reference being had to the accompanying drawings, forming a part of this specification.

My invention relates to an improved stacking machine and more particularly to a stacking machine for building up transformer cores and the like.

According to my invention I mount the coil with its primary and secondary windings in a carriage between two stacks of core plates or strips. An operating lever is then manipulated to slide the core plates alternately from one stack and then the other into position in the coil from opposite ends thereof. The core plates are in the preferred form of the invention assembled from the bottom of the stacks. The bottom plates of each stack lie in substantially the same plane and I provide for lowering each plate as it is moved into assembled position from the plane of the bottom plate of the opposite stack, so that it will not interfere with the movement of that plate into assembled position, each plate being depressed out of the plane of the bottom plate in the opposite stack as it is moved into assembled position and the plates being moved alternately from opposite stacks and alternately in opposite directions into position in the coil. The same motion that moves one plate into assembled position sets the assembling means for the opposite stack and the bottom plate of that stack for movement into assembled position with the operation which restores or sets the assembling means and bottom plate of the first stack.

For locking the assembling means against further operation and releasing the core and coil assembly when completed I provide trip means which is automatically operated as the core is completed and I provide for conveniently restoring the assembling means and the coil carriage into position to receive another coil and to assemble a core therein.

The core plates of the embodiment shown are iron stampings of E formation assembled with their open ends opposing each other. These are adapted to be assembled with the machine which I have provided and they provide an excellent core when completed, but the present invention is not limited to use with core plates of a particular shape or formation.

The mechanism which I have provided is of simple, rugged and inexpensive construction. The operating mechanism is characterized by its ease and convenience of operation and the entire machine is especially suited for use by unskilled labor in assembling transformer cores and the like. One operator is all that is required and the increased production of that operator over hand assembly by the same operator is marked. The skill of the labor required is no greater than in hand assembly. The hardship on the hands is eliminated and the labor cost may be reduced. The parts of the machine are all conveniently accessible and an adjustment is provided for the tripping means, to permit setting the machine to build up or assemble cores of different sizes.

In order to acquaint those skilled in the art with the manner of constructing and operating my invention, I shall now describe a particular embodiment of the same in connection with the accompanying drawings in which:

Fig. 1 is a front elevational view of a machine embodying my invention;

Fig. 2 is a top plan view of the same;

Fig. 3 is a vertical section on substantially the line 3—3 of Fig. 2;

Fig. 4 is a fragmentary vertical section taken on substantially the line 4—4 of Fig. 3;

Fig. 5 is a top plan view of the coil and core receiving carriage;

Fig. 6 is a detail horizontal section on line 6—6 of Fig. 1;

Fig. 7 is a detail vertical section on line 7—7 of Fig. 2;

Fig. 8 is a detail fragmentary elevation on line 8—8 of Fig. 2;

Fig. 9 is a perspective view of the completed coil and core assembly; and

Figs. 10 and 11 are fragmentary detail and more or less diagrammatic side elevations of the operating treadle showing the same counterweighted and provided with a spring respectively for urging the coil carriage upwardly.

Referring to the drawings the machine comprises a pair of relatively long narrow bed plates 10 joined together with a space 12 between them, by side plates 14 which extend up above the plates 10 and form side guides therealong. The table or bed thus formed may have relatively stationary support as by mounting it through straps or brackets 15 upon a work bench 16, although of course the relatively stationary table or bed of the stacking machine may have supporting legs of its own or it may be supported or mounted in any other suitable or preferred manner.

Depending vertically from each of the opposite sides of the opening or space 12 is a pair of guides 18 secured at their upper ends to the under surfaces of the bed plates 10 by angle brackets 19 and joined at their lower ends by cross frame pieces 20. The rear ends of the frame pieces 20 project rearwardly beyond the rear depending guides 18 and rotatably journaled between said rearwardly projecting ends of the frame pieces 20 is a pulley 22.

Mounted for vertical movement between the adjacent spaced ends of the bed or table-forming plates 10 is a coil carriage designated generally at 25. The carriage 25 includes a block 26 having a bore or pocket 27 in which a coil carrying plunger plate 28 is mounted. Mounted upon the top or upper surface of the block 26 as by means of screws 29 is a plate 30 having a generally rectangular opening 31 for receiving the coil 32 with its axis lengthwise with respect to the table or bed plates 10. The length and width of the opening 31 being less than the diameter of the bore 27 the plate 30 holds the plunger coil-carrying plate 28 against displacement from the bore 27 and the plate 28 is yieldably pressed up against the bottom of the plate 30 by a coiled spring 33 arranged in the bore 27 between the plate 28 and the bottom wall of the block 26. The bore 27 has a vent opening 34.

Secured as by means of screws or in any other suitable manner at their upper ends to the sides of block 26 and operating vertically between the relatively stationary guides 18 are a pair of guides 35 between the lower free ends of which a crosspiece 36 is suitably secured. A flexible element 38 connected at one end with the crosspiece 36 of the vertically movable coil carriage is trained over the fixedly supported pulley 22 and extends down and is connected at its opposite end with a suitable foot treadle shown diagrammatically at 40 in Fig. 4.

The core plates 42 are of general E formation having bases 43 and three parallel legs 44, 45 and 46 extending at substantially right angles therefrom. The central legs 45 form the core proper for carrying the flux through the coils 32 while the legs 44 and 46 and bases 43 form the yoke about the coils. The core plates 42 are arranged in two stacks with their open ends opposing each other, one stack on each side of the opening or space 12 between the said plates 10. Each stack is supported between a pair of vertical guides 45' secured at their lower ends between the side plates 14 of the bed of the machine and having on their opposing surfaces guide ribs 46' which extend vertically and engage in slots 47 in the base 43 and free ends of the legs 45 of the core plates and thereby position and retain the core plates properly positioned in their respective stacks.

For the purpose of sliding the bottom plates 42 alternately from the two stacks into assembled position in the coil 32 I provide a pair of blades 50 and 52 slidably mounted upon the upper surfaces of the table or bed plates 10 between the side plates 14. The core plate assembling blades 50 and 52 are carried by blocks 53 and 54 which blocks 53 and 54 are guided between the side plates 14 and suitable overlying retention strip 56 may be secured to the side plates 14 over the margins of the blocks 53 and 54 to hold said blocks and thereby the blades 50 and 52 properly in place upon the table or bed of the machine. The blocks 53 and 54 are connected by means of a yoke member 60, the opposite ends of which yoke member are pivoted to the respective blocks as by means of pins 62.

Pivoted upon one of the pins 62 and pivotally connected at its opposite end at 63 to an operating lever 64 is a connecting link 65. The operating lever 64 has fixed pivotal support at one end as shown at 66 with a relatively fixed bracket arm 67 secured to the bottom of one of the bed or table plates 10. The free end of lever 64 has a handle 68 by grasping which the lever 64 may be swung back and forth from the full to the dotted line positions of Fig. 2 with an accompanying movement of the connected blocks 53 and 54 with their respective blades 50 and 52 and the connecting yoke 60 back and forth from the full to the dotted line position shown. Those portions of the bed plates 10 which underlie the stacks of core plates 42 may be provided with renewable surfaces as by setting renewable blocks 70 therein, and the blade members 50 and 52 are preferably of a thickness less than the thickness of the core plates 42 to avoid any possibility of jamming or of sliding more than one core plate from either stack. Rods 72 having eyed ends 73 pivoted upon pins 62 operate reciprocably through openings in crosspieces 74 and have nuts 75 threaded upon them for cooperation with the crosspieces 74 to limit the movement of the connected shoes or blades and yoke member in opposite directions. The nuts 75 are threaded upon the rods 72 and are thereby conveniently adjustable to adjust the movement of the connected shoes and yoke member in either direction before said movement is stopped or terminated by engagement of one of the nuts 75 with its cooperating cross member 74. This permits convenient adjustment of the blade movement for cores of different sizes.

For the purpose of guiding the core plates 42 into position and depressing or lowering them out of the plane of the bottom plate of the opposite stack as they are moved into assembled position I provide a pivoted roller frame comprising side pieces 80 between the opposite ends of which a pair of rollers 82 are journaled. The side pieces 80 are pivoted between their ends upon the bed of the machine as by means of screws or pins 83 which extend through vertically elongated slots 84 in the side plates 14, and a coiled spring 85 connected at its upper end to the roller carriage and its lower end to a relatively fixed pin 86 yieldably presses the rollers 82 down toward the upper surface of the plate 30. The bottoms of the rollers 82 lie substantially in the plane of the under surface of the bottom plate 42 of the right-hand stack (Fig. 3) so that as that plate is moved from the stack and into assembled position in the coil, it will be depressed to a position just below the position of the bottom plate of the opposite stack so as to not interfere with the following movement of that plate into assembled position, the vertical yieldability of the roller carriage permitting the successive movement of the core pieces beneath the depression rollers 82. Obviously as each plate is inserted into the coil, the coil and coil carriage will move downwardly substantially the thickness of a coil plate, the plates being stacked in the coils and beneath the rollers 82. The pivotal and yieldable mounting of the roller carriage permits the roller to tilt slightly to permit the movement of the core plates into the coil first under one roller and then under the other. The rollers 82 are spaced sufficiently to just receive the coil 32 endwise therebetween, and it is to be understood that the coil may comprise the usual primary and secondary windings or it may be of any other suitable or preferred form.

The treadle 40 may be of a weight sufficient to hold the coil carriage up against the rollers 82 or up against the core pieces as they are assembled between the carriage and the rollers 82, or the treadle 40 or flexible element 38 may be counterweighted as shown in Fig. 10 for this purpose. Spring means may of course be employed as shown in Fig. 11 in lieu of the counterweighting for urging the coil carriage upwardly or any other suitable means may be provided for this purpose.

The operation of the machine as thus far described is as follows:

The primary and secondary windings of the coil 32 may be wound in any suitable or preferred manner preferably upon a generally square sleeve 90 (Fig. 4) of insulation. The coil 32 is then arranged between end pieces of insulation 91 which have substantially square openings which register with the interior of the generally square sleeve 90. The coil with its end pieces is then inserted between the rollers 82 with its axis endwise of the table and down upon the yieldable plate 28, the yieldability of which plate permits slight variations and relative movement so that neither the coil nor core pieces will be injured thereby, the coil with its end pieces fitting down into the opening in the plate 30. The core plates 42 are stacked in the two vertical stacks with their open ends opposing each other and with the core plates thus stacked and the coil in place the operating lever 64 is swung back and forth from its full to its dotted line positions as shown in Fig. 2.

Upon the movement of the lever 64 to the dotted line position of Fig. 2 the blade 52 slides the bottom plate 42 of the right-hand stack (Fig. 3) from the bottom of said stack beneath the rollers 82 and into position in the coil with a simultaneous depression of said plate out of the plane of the bottom plate in the opposite stack and a corresponding downward movement of the entire coil carriage. The assembling movement for the right-hand stack sets the assembling means for the left-hand stack so that as the lever 64 is swung in the opposite direction back to its full line position the blade 50 will slide the bottom core plate 42 of the left-hand stack from said stack beneath the rollers 82 and into the coil on top of the preceding plate from the opposite stack with an accompanying depression of the entire coil carriage, coil and core assembly substantially the thickness of one core plate. As the blade 50 is moving a core plate from the left-hand stack into assembled position in the coil, the plate 52 clears the bottom plate of the right-hand stack and permits said plate to drop down into the plane of the blade 52 to be moved thereby into the coil upon swinging of the lever 64 in the opposite direction. The blades 50 and 52 move together so that when one approaches the opening 12 the other moves away from said opening and vice versa.

For the purpose of preventing further operation upon completion of the core until the completed core and coil assembly is removed and the machine is reset I provide a swinging lever 95 pivoted at 96 to one end of one of the side plates 14. This lever 95 carries a U-shaped stop 97 which straddles the adjacent side plate 14 and retention strip 56 and is adapted to drop with the lever 95 when the same is tripped, down ahead of the block 53 and into the path of movement thereof to prevent further reciprocation of said block and thereby further reciprocation of the entire core assembling mechanism.

The stop 97 is normally held out of locking position by engagement of the upstanding arm 98 of a bell crank lever 99 with the free end of the arm 95. The bell crank lever 99 has relatively fixed pivotal support at 100 and has an inwardly extending arm 102 which lies in the path of movement of a tripping arm 103 secured to the bottom of the block 26 and movable therewith. A set screw 104 adjustably secured in the arm 103 provides for adjusting the point of engagement with the arm 102 and thereby the particular number of core plates which are assembled before the trip is released and the blocking element 97 dropped into locking position.

Upon removing the completed core and coil assembly the coil carriage may be raised to position to receive another coil by depressing the treadle 40, the movement of the set screw 104 away from the arm 102 releasing said arm of the bell crank lever and permitting said lever to be set back into position under the free end of lever 95 to hold the locking element 97 out of locking position, the levers 95 and 99 being retained in these relative positions by a coiled spring 106 connected between them as shown in Fig. 1.

While the roller carriage for guiding the core plates into assembled position and depressing them may be set to allow for slight burrs on the core plates or for slight variations, screws 112 secured in the recessed upper edges of side plates 14 have heads which overlie the side pieces 80 of the roller carriage for cooperation with said side pieces to limit the swing and vertical yieldability of said carriage and these screws may be conveniently adjusted to limit the discrepancies or variations which will be permitted. The heads of screws 112 may be adjusted upwardly to permit greater variations or discrepancies or downwardly to decrease the amount of variation or discrepancy which will be permitted.

I do not intend to be limited to the particular details shown and described except as required by the scope of the appended claims.

I claim:

1. In a machine of the class described, the combination of means for supporting a stack of core pieces, means for supporting a coil adjacent said stack and means for moving the core pieces successively from said stack into assembled position in the coil.

2. In a machine of the class described, the combination of means for supporting a stack of core pieces, means for supporting a coil adjacent said stack, means for moving the core pieces successively from said stack into assembled position in the coil, said means comprising a pivoted lever and a core assembling member connected therewith.

3. In a machine of the class described, the combination of means for supporting a stack of core pieces, means for supporting a coil adjacent said stack, means for moving the core pieces successively from said stack into assembled position in the coil, said means comprising a pivoted lever, a core assembling member and an adjustable connection between the assembling member and the lever for permitting adjustment of the movement of said member for different sizes of core pieces.

4. In a machine of the class described, the combination of means for supporting a stack of core pieces, means for supporting a coil adjacent said stack, an assembling member mounted for reciprocation and means for reciprocating said member to receive the core pieces successively from said stack and to move them to assembled position in the coil.

5. In a machine of the class described, the combination of means for supporting a stack of core pieces, means for supporting a coil adjacent said stack, a reciprocable assembling member and a pivoted lever for actuating said member.

6. In a machine of the class described, the combination of means for supporting a stack of core pieces, means for supporting a coil adjacent said stack, and an assembling member underlying said stack and reciprocable in one direction to receive a core piece and in the opposite direction to move said core piece into assembled position in the coil.

7. In a machine of the class described, the combination of means for supporting a stack of core pieces, means for supporting a coil adjacent said stack, an assembling member underlying said stack and reciprocable in one direction to receive a core piece and in the opposite direction, to move said core piece into assembled position in the coil, and means for moving said core piece out of the plane of the assembling member as it is moved into assembled position.

8. In a machine of the class described, the combination of means for supporting a stack of core pieces, means for supporting a coil adjacent said stack, and means for moving the core pieces successively from the bottom of said stack into assembled position in the coil.

9. In a machine of the class described, means for supporting a stack of core pieces, means for supporting a coil adjacent said stack, means for moving the core pieces from said stack into assembled position in the coil, the coil support being depressible and means overlying said coil support for receiving the core pieces as they are assembled to move the assembled core out of the plane of assembly.

10. In a machine of the class described, the combination of means for supporting a coil, means for supporting a stack of core pieces adjacent the coil support and means for moving the core pieces successively from the bottom of the stack into assembled position in the coil and for depressing the coil with the introduction of the core pieces.

11. In combination, means for supporting a coil, means for supporting a plurality of core pieces, means for assembling said core pieces in said coil, the assembling means for alternate core pieces being set by the assembling movement of the assembling means for the other core pieces.

12. In combination, means for supporting a pair of stacks of core pieces, means for supporting a coil between said stacks and means for moving core pieces alternately from said stacks into assembled position in said coil.

13. In combination, means for supporting a coil, means for supporting a stack of core pieces at each end of said coil, means for moving core pieces alternately from said stacks to build up a core in said coil, and means for depressing the coil and core assembly with the introduction of the core pieces.

14. In combination, means for supporting a pair of stacks of core pieces, a pair of members for shifting the core pieces alternately from said stacks, means for supporting a coil between said stacks to receive said core pieces, and means connecting said shifting members for setting one with the assembling movement of the other and vice versa.

15. In a machine of the class described, the combination of a plurality of means for supporting core pieces means for supporting a coil for receiving said core pieces, a pair of members for assembling said core pieces in said coil and means connecting said assembling members for setting one with the assembling movement of the other and vice versa.

16. In a machine of the class described, a bed portion, means for supporting a pair of core stacks in spaced relation thereon, and a coil carriage depending from said bed between said core stacks.

17. In a machine of the class described, a bed portion, means for supporting a pair of core stacks in spaced relation thereon, a coil carriage supported between said stacks, and means for moving the core pieces alternately from the bottom of said stacks to build up a core in the coil.

18. In a machine of the class described, a bed portion having an opening for the reception of a coil, a coil carriage movable vertically beneath said opening, means for supporting a core stack at each of the opposite ends of the coil, and means for moving the core pieces alternately from said stacks into assembled position in the coil.

19. In a machine of the class described, the combination of a pair of assembling members, means for supporting a pair of core stacks therebetween and means for supporting a coil between said core stacks to receive the core pieces therefrom, said assembling members being operative to move the core pieces from the stacks and into assembled position about the coil.

20. In a machine of the class described, a bed portion, means for supporting a pair of stacks of core pieces thereon, a pair of connected members for moving core pieces alternately in opposite directions from said stacks, and means for supporting a coil between said stacks to receive said core pieces.

21. In a machine of the class described, a bed portion, means for supporting a pair of stacks of core pieces thereon a pair of connected members slidably mounted upon the bed portion and adapted for moving core pieces alternately in opposite directions from said stacks, a pivoted lever for actuating said connected members, a depressible coil carriage for supporting a coil between said stacks in position to receive said core pieces, means opposing depression of said carriage, and yieldably mounted roller means under which the core pieces are moved in their assembling movement to depress said carriage against said depression opposing means.

22. In a machine of the class described, a bed portion, means for supporting a pair of stacks of core pieces thereon, a pair of connected members slidably mounted upon the bed portion and adapted for moving core pieces alternately in opposite directions from said stacks, a pivoted lever for actuating said connected members, a depressible coil carriage for supporting a coil between said stacks in position to receive said core pieces, means opposing depression of said carriage, and yieldably mounted roller means under which the core pieces are moved in their assembling movement to depress said carriage against said depression opposing means, a latch for said assembling members, and means actuated by the downward movement of said carriage for setting said latch.

23. In combination, means for supporting a stack of core pieces, means for supporting a coil adjacent said stack, means for moving the core pieces from the stack into assembled position in the coil, a latch for said assembling means, and means for automatically setting said latch upon the completion of the core.

24. In combination, means for supporting a stack of core pieces, means for supporting a coil adjacent said stack, means for moving the core pieces from the stack into assembled position in the coil, and means for depressing the core and coil assembling with the introduction of said core pieces.

25. In combination, means for supporting a stack of core pieces, means for supporting a coil adjacent said stack, means for moving the core pieces from the stack into assembled position in the coil, and means for raising the coil support to its initial position upon the completion and removal of the core.

26. In combination, means for supporting a stack of core pieces, means for supporting a coil adjacent said stack, means for assembling core pieces from said stack in said coil and a stop for said assembling means, said stop being adjustable for core pieces of different lengths.

In witness whereof, I hereunto subscribe my name this 12th day of September, 1924.

MORRIS M. FULTON.